April 4, 1950　　　　R. L. MALCOM　　　　2,503,117
GOGGLES
Filed March 6, 1946
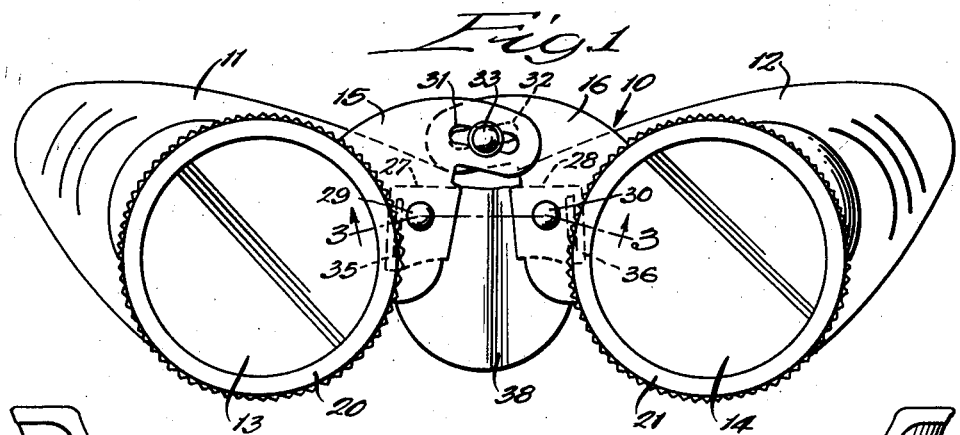
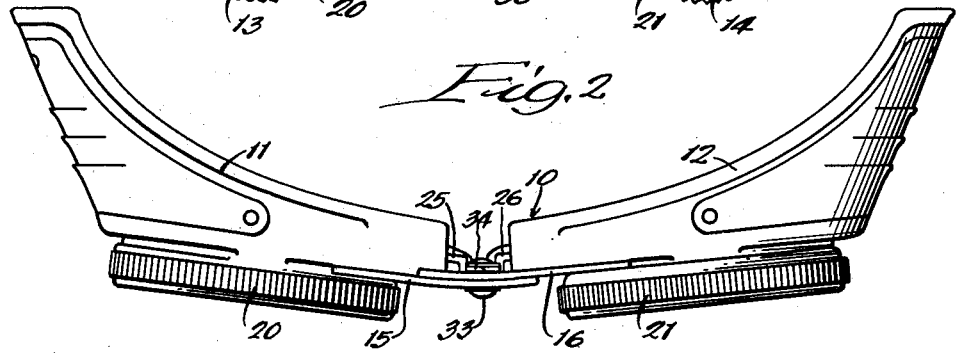
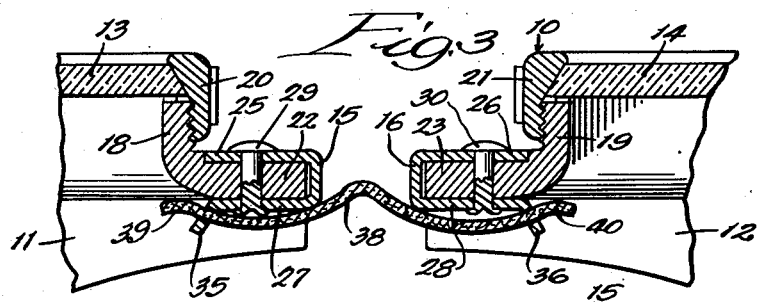
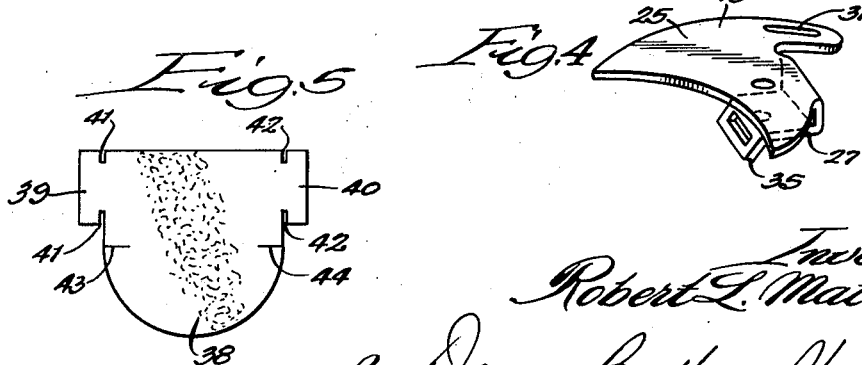
Inventor:
Robert L. Malcom Patented Apr. 4, 1950

2,503,117

UNITED STATES PATENT OFFICE 2,503,117

GOGGLES

Robert L. Malcom, Chicago, Ill., assignor to Chicago Eye Shield Company, a corporation of Illinois Application March 6, 1946, Serial No. 652,372

4 Claims. (Cl. 2—14)

This invention relates to goggles and more particularly to goggles of the type for industrial use. Such goggles may include a pair of lens boxes containing lenses and also a bridge member for connecting the lens boxes.

The principal object of this invention is to provide an improved bridge member for connecting the lens boxes and an improved nosepiece therefor which will protect the wearer from irritation by the bridge member and the rivets securing the bridge member to the lens boxes.

In carrying out this object of the invention the lens boxes may be provided with flanged portions and lens-receiving portions and the bridge member may comprise a pair of U-shaped brackets, one for each lens box. The U-shaped brackets may fit over the flanged portions of the lens boxes and rivets may extend through both arms of the U-shaped portions and the flanged portions of the lens boxes to secure the brackets to the lens boxes.

One of the arms of the U-shaped brackets may be provided with an extension conforming to and engaging the lens-receiving portion of the lens box to guide the same so that only a single rivet may be required to secure rigidly the bracket to the lens box. That arm may also be provided with an extension provided with means for adjustably connecting the brackets and hence the lens boxes.

The other arms of the U-shaped brackets may be provided with slotted ears for receiving extensions of a nose piece and the extensions may be enlarged to cooperate with the slotted ears for holding the nose piece in position on the bridge member. The nose piece covers the bridge member adjacent the nose of the wearer and also covers the securing rivets and therefore protects the wearer from irritation therefrom. The nose piece may be made of leather or similar material.

Other objects and advantages will become apparent to those skilled in the art upon reference to the accompanying specification, claims, and drawing, in which—

Fig. 1 is a front elevational view of the goggles of this invention;

Fig. 2 is a top plan view;

Fig. 3 is an enlarged sectional view taken substantially along the line 3—3 of Fig. 1;

Fig. 4 is a perspective view of one of the U-shaped brackets forming the bridge member; and Fig. 5 is a plan view of the nose piece.

The goggles are generally designated at 10 and may include lens boxes 11 and 12 for receiving lenses 13 and 14. The bridge member connecting the lens boxes 11 and 12 may comprise a pair of U-shaped brackets 15 and 16.

The lens boxes 11 and 12 are provided with lens-receiving portions 18 and 19 which are externally threaded for receiving retainers 20 and 21 for holding the lenses 13 and 14 in position. The lens boxes are also provided with flanged portions 22 and 23 and preferably the lens boxes and retainers are made of plastic.

The U-shaped bracket 15 includes spaced arms 25 and 27, and likewise the U-shaped bracket 16 includes spaced arms 26 and 28. The U-shaped brackets 15 and 16 are mounted over the flanged portions 22 and 23 of the lens boxes and are secured in place thereon by rivets 29 and 30 respectively. The arms 25 and 26 of the U-shaped brackets fit the contour of the lens-receiving portions 18 and 19 of the lens boxes and as a result the U-shaped brackets may be secured to the lens boxes in a rigid manner even though a single rivet is utilized for this purpose. The arms 25 and 26 are also provided with extensions including slots 31 and 32 for receiving a rivet 33. The rivet also carries a spring washer 34 for resiliently clamping the brackets 15 and 16 together. By reason of the slots 31 and 32, and the resilient rivet construction 33, the brackets 15 and 16 and hence the lens boxes 11 and 12, may be adjustably connected and positioned with respect to each other.

The other arms 27 and 28 of the U-shaped brackets 15 and 16 are provided with slotted ears 35 and 36, the ears extending beyond the rivets 29 and 30 and being clearly beyond any possible contact with the nose of the wearer of the goggles.

A nose piece 38, preferably made of leather or other similar material, is provided with extensions 39 and 40 for insertion in the slotted ears 35 and 36. The extensions 39 and 40 are enlarged by reason of the notches 41 and 42 so that when the extensions 39 and 40 are inserted in the slotted ears 35 and 36, they are held in position therein by the enlarged extensions. In other words, the notches 41 and 42 cooperate with the slotted ears 35 and 36 in this respect. The nose piece 38 is also provided with slits 43 and 44 to provide flexibility in the nose piece 38 so that it may more nearly conform to the shape of the nose of the wearer.

As will be noted in the drawing, the nose piece 38 covers the rivets 29 and 30 and those portions of the brackets 15 and 16 which are nearest to the nose of the wearer. The nose piece, therefore, prevents irritation of the nose of the wearer by the rivets or the brackets of the bridge member. Because of the enlargements 39 and 40 on the nose piece 38 and the cooperating slotted ears 35 and 36, the nose piece 38 may be readily replaced upon wear or soiling of the same.

While for purposes of illustration one form of this invention has been disclosed, other forms thereof may become apparent to those skilled in the art upon reference to this disclosure and, therefore, this invention is to be limited only by the scope of the appended claims and prior art.

I claim as my invention:

1. In goggles having a pair of lens boxes each having a lens receiving portion and a flanged portion, a U-shaped bracket for each lens box encompassing the flanged portion and riveted thereto, one arm of each U-shaped bracket provided with means for connecting the lens boxes and the other arm being provided with a slotted ear, and a nose piece covering the rivets and having extensions extending into the slotted ears.

2. In goggles having a pair of lens boxes each having a lens receiving portion and a flanged portion, a U-shaped bracket for each lens box encompassing the flanged portion and riveted thereto, one arm of each U-shaped bracket provided with means for connecting the lens boxes and the other arm being provided with a slotted ear, a nose piece covering the rivets and having extensions extending into the slotted ears, and enlargements on the extensions cooperating with the slotted ears for securing the extensions therein.

3. In goggles having a pair of lens boxes each having a lens receiving portion and a flanged portion, a U-shaped bracket for each lens box fitting over the flanged portions thereof, one arm of each U-shaped bracket having a portion conforming to and fitting the lens receiving portion of the lens box and having means for connecting the lens boxes and the other arm thereof having a slotted ear, a rivet for each lens box passing through the flanged portion and the arms of the U-shaped bracket, and a nose piece covering the rivets and having extensions extending in the slotted ears.

4. In goggles having a pair of lens boxes each having a lens receiving portion and a flanged portion, a U-shaped bracket for each lens box fitting over the flanged portions thereof, one arm of each U-shaped bracket having a portion conforming to and fitting the lens receiving portion of the lens box and having means for connecting the lens boxes and the other arm thereof having a slotted ear, a rivet for each lens box passing through the flanged portion and the arms of the U-shaped bracket, a nose piece covering the rivets and having extensions extending in the slotted ears, and enlargements on the extensions cooperating with the slotted ears for securing the extensions therein.

ROBERT L. MALCOM.

REFERENCES CITED

The following references are of record in the file of this patent:

UNITED STATES PATENTS

| Number | Name | Date |
|---|---|---|
| 1,369,040 | Malcom | Feb. 22, 1921 |
| 2,197,973 | Everett et al. | Apr. 23, 1940 |
| 2,270,238 | Clarke et al. | Jan. 20, 1942 |